Nov. 10, 1959 R. D. PARROTT 2,912,497

OPTICAL SCANNER

Filed Dec. 21, 1955

INVENTOR.
R. D. PARROTT
BY C R Hyde Jr.
ATTORNEY

United States Patent Office 2,912,497

Patented Nov. 10, 1959

2,912,497

OPTICAL SCANNER

Robert D. Parrott, West New York, N.J., assignor to The Western Union Telegraph Company, New York, N.Y., a corporation of New York Application December 21, 1955, Serial No. 554,494

8 Claims. (Cl. 178—7.1)

The present invention relates to optical systems and more particularly to optical systems especially adapted for facsimile transmitters.

In one type of facsimile machine in common use, a continuous sheet of message paper is fed at a constant rate past a scanning area that is illuminated by a source of light. The light is provided by a lamp or plurality of lamps located adjacent the message sheet. By means of a lens, an image of the copy is projected on a dissecting plane where elemental areas are scanned by a beam. The beam is defined by two apertured plates, one of which is stationary and has a transparent slot which defines a plane of light reflected from the message paper. The other apertured member takes the form of a spiral and is caused to rotate so that the intersection of the spiral aperture and the slot will move across the image. Thus a single light beam is defined which will scan elemental areas of the moving image and will be reflected into a photocell which produces a varying voltage in accordance with the reflectivity of the elemental areas scanned. In such a system it is of course desirable that the scanning aperture move at a constant speed across the message paper or image. It is well known that the Archimedes spiral when rotated at a constant velocity will result in a constant rate of the moving intersection point with the straight line radial slot. However, since in an Archimedes spiral the normal to a tangent at any point never passes through the spiral center, the angle of intersection of the spiral and the radial slot will never be 90° and will continuously vary. Since the angle of intersection varies, the parallelogram-shaped aperture defined by the intersection will also vary to produce a light beam of varying size and shape. Because of this, the definition and signal level of the transmitted signals will also vary as a function of the size and shape of the light beam. It is to this general problem that the present invention is directed.

The primary object of the present invention is to provide an optical scanning system employing a beam of light which will remain constant throughout its scanning path.

Another object of the present invention is to provide a scanning system in which the angle of intersection of a rotating transparent spiral and a transparent slot will remain constant.

Another object of the present invention is to provide an improved scanning system especially adapted for facsimile transmission.

Throughout the present description the term "involute" is used to designate an involute of a circle and the term "spiral" includes both an involute and an Archimedes spiral.

The above objects are achieved in the present invention by a unique relative positioning and contour of the transparent slotted members. It has been found that a spiral having the form of an involute will intersect a straight line located tangent to the base circle of the involute at a right angle and the angle will remain constant regardless of the position at which the involute and line intersect. Also, if the involute is rotated at a constant velocity the point of intersection will move in a straight line at a constant velocity. Therefore, one embodiment of this invention comprises a rotating transparent involute and a stationary transparent slot positioned to be tangent to the base circle of the involute.

The invention will be more fully understood from the following description taken with the drawings in which.

Figures 1, 2:
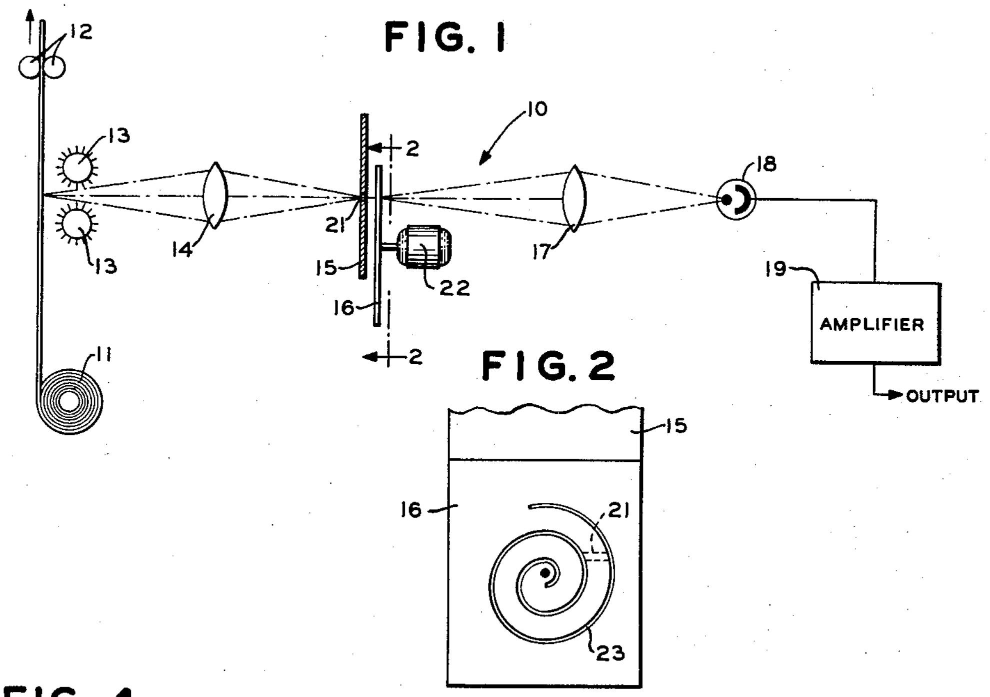
Fig. 1 is a diagrammatic representation of a facsimile scanning system of the type employing the present invention.
Fig. 2 is a view taken on the line 2—2 of Fig. 1.

Referring now to Fig. 1, a facsmile scanning system generally indicated by numeral 10 includes a supply roll of message paper 11 and a pair of feed rollers 12. A pair of lamps 13 which may be of the fluorescent tube type are located adjacent the path of the vertically fed message paper. Light from the lamps 13 is reflected off the paper and through a suitable lens 14 to form an image on the outer surface of member 15. This surface upon which the image is formed may be termed the dissecting plane since elemental areas of the image are scanned. Apertured plate 15 is fixedly mounted and as shown in the drawings has a horizontal transparent slot 21. This slot will therefore define a plane of light reflected from a straight line area across the message paper. Apertured plate 16 is mounted on the shaft of a motor 22 to be rotated at a constant speed. A spiral transparent aperture 23 in plate 16 will intersect the plane of light of slot 21. This point of intersection will result in a single beam of light which will travel across the image in a straight line path and be directed into the photocell 18 through lens 17. Lens 17 is so positioned to form an image of the iris of lens 14 on the face of the photocell 18 thereby forming a spot of light which is stationary on the photocell. The output of the photocell is suitably amplified at 19 and transmitted to a distant receiving point.

Figure 3A:
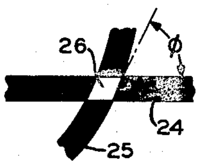
Figure 3B:
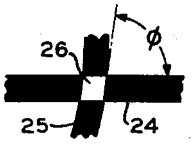

To understand the basic principles of the present invention, reference will now be made to Figs. 3 and 4 where numeral 24 represents a straight line slot and 25 a portion of a rotating Archimedes spiral. As therein shown these do not intersect at a 90° angle but rather at an angle depending upon the point of intersection. Thus angle $\phi$ will vary depending upon the radius of the Archimedes spiral at the point of intersection. When angle $\phi$ varies the parallelogram-shaped aperture 26 will also vary and therefore the scanning beam will change in cross-sectional area and shape from point to point. A theoretically ideal scanning system would have an aperture of constant size and shape and therefore the angle of intersection would have to remain constant throughout the movement of the scanning beam across the message paper.

Figure 4:
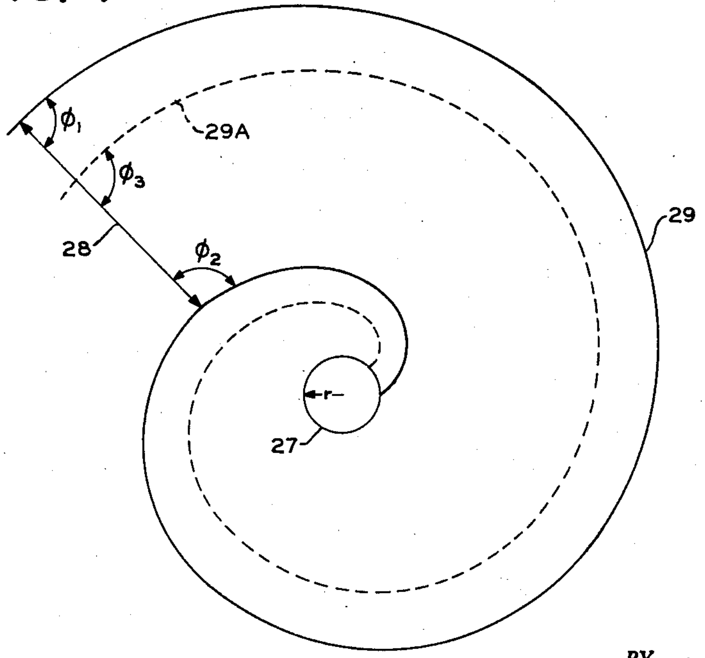
Figs. 3A, 3B and 4 illustrate principles of the present invention.

In Fig. 4 curve 29 is an involute of a base circle 27. As is well understood, such an involute is formed by a point on a perfectly flexible inextensible thread kept taut as it is wound upon or unwound from the base circle. As such an imaginary thread is wound or unwound from the circle, its extended straight portion forms a line 28 which may be termed the generatrix. Line 28 is positioned tangent to the base circle 27 and hence offset from the center a distance equal to the radius $r$ of the base circle. The involute intersects line 28 at the outer end in an angle $\phi_1$ which is equal to 90°. Similarly $\phi_2$ the angle of intersection at the inner end is equal to 90°. As the involute is rotated, it will assume the dotted line position 29A at which point it will intersect line 28 at $\phi_3$ which will also be a 90° angle. Thus as the involute rotates and the angle of intersection changes position, it will remain constant at 90°. With the angle of intersection remaining constant, the area of the aperture will also remain constant resulting in a scanning beam which will not vary from point to point. Another important feature of a 90° intersection is that a more sharply defined output pulse is generated. When the angle departs from 90° as in prior art devices, the parallelogram-shaped aperture results in a wedge-shaped leading and trailing edge cutting the image as the intersection point moves across the dissecting plane. Thus the varying light beam passing to the photocell will tend to vary gradually from one elemental image area to another. However, with a 90° intersection as provided by the present invention, the rectangular aperture having a substantially straight line leading and trailing edge will cause the light beam to vary more sharply to produce well defined output pulses. Furthermore, since the angle of intersection remains constant, the shape of these pulses does not vary from point to point on the image or on the message paper.

Referring back to Figs. 1 and 2, opaque plate 16 has a transparent involute 23 and the transparent slot 21 in plate 15 is so located as to be tangent to the base circle of the involute. It is understood that the generatrix, line 28 extended, intersects the involute at a plurality of points depending upon the number of involute turns. This problem of multiple intersection points is eliminated in the embodiment of the invention herein disclosed by limiting the length of the slot 21 to a distance equal to the involute pitch or distance the involute advances in one turn.

Throughout the specification, reference has been made to aperture or slot 21 and involute aperture 23. It should be understood that these are not necessarily physical openings in their respective members but rather light openings. For example, plates 15 and 16 may take the form of glass panes each having an opaque film on a surface thereof. Plate 15 would have a straight line slot scribed in the opaque film and plate 16 would have an involute scribed therein.

Though the present invention has been described with respect to a specific embodiment thereof, it is understood that this is not to be considered as limiting the invention as defined in the appended claims.

What is claimed is:

1. A facsimile system comprising means to move a sheet of message paper past an illuminated scanning line portion, means to form an image of the scanning line of the message copy, means to scan successive elemental areas of said image, said image scanning means including a stationary opaque plate having a straight line transparent area, a rotatable opaque plate having an involute shaped transparent area, said rotatable plate being located adjacent said stationary plate and said straight line transparent area lying in a line that is tangent to the base circle of the involute transparent area whereby the right-angle intersection of the straight line and involute transparent area sweeps across said message copy image.

2. A facsimile system comprising means to move a sheet of message paper past an illuminated scanning line portion, lens means to form an image of the scanning line of the message copy, means to scan successive elemental areas of said image, said image scanning means including a stationary opaque plate having a straight line transparent area, a rotatable opaque plate having an involute shaped transparent area, said rotatable plate being located adjacent said stationary plate and the projection of said straight line transparent area on said rotatable plate being tangent to the base circle of the involute transparent area whereby the right-angle intersection of the straight line and involute transparent area sweeps across said message copy image.

3. A facsimile system comprising means to pass a continuous sheet of message paper past a viewing area, means to illuminate said viewing area, a stationary opaque plate spaced a distance from the viewing area and parallel to the path of travel of the message paper, lens means interposed between the viewing area and the stationary plate to form an image of the message copy on one surface of the stationary plate, said stationary plate having a straight line transparent slot, a rotatable opaque plate having a transparent area curved to form an involute of a circle, said rotatable plate being located adjacent the stationary plate and parallel thereto, the length of said slot being substantially equal to the pitch of said involute, said transparent slot being located in a line that is tangent to the base circle of the transparent involute whereby the image is scanned by a beam formed by the right-angle intersection of the slot and involute, a light sensitive device and lens means to direct said beam to the light sensitive device.

4. In a scanning system wherein a light beam traverses a scanning area, an opaque stationary member having a straight line transparent slot, a rotatable opaque member having a transparent line curved to form an involute of a circle, said rotatable member being located adjacent the stationary member and parallel thereto, the projection of said transparent slot on said rotatable member being tangent to the involute base circle.

5. In a facsimile system comprising means for moving message copy past a predetermined scanning line, means to illuminate the message copy passing said scanning line optical means for focusing the copy passing said scanning line on a fixed straight line, an opaque member located in the optical path having a linear optical aperture substantially coincident with said fixed straight line, a plate havng an optical aperture curved to form an involute having a predetermined base circle, said plate being positioned substantially in the plane of said fixed straight line, said linear optical aperture lying in a line that is substantially tangent to the base circle of the involute optical aperture and spatially disposed so as to intersect said involute optical aperture, means to rotate said plate to produce a traveling intersection of said linear optical aperture and involute optical aperture, optical pickup means, and optical means for projecting successive elemental areas of the image of said fixed straight line on said optical pickup means.

6. A facsimile system as defined in claim 5 wherein said linear optical aperture is not longer than the pitch of said involute.

7. A facsimile system comprising means for moving message copy past a predetermined scanning line, means to illuminate the message copy passing said scanning line, optical means for focusing the copy passing said scanning line on a fixed straight line, an opaque member located in the optical path having a linear optical aperture substantially coincident with said fixed straight line, a plate having an optical aperture curved to form a spiral, means to rotate said plate, said plate being positioned substantially in the plane of said fixed straight line, said linear optical aperture lying in a line that is offset to one side of the center of the spiral a distance whereby said linear optical aperture and spiral optical aperture intersect at substantially a 90° angle and the intersection travels substantially at a uniform linear speed, optical pickup means, and optical means for projecting successive elemental areas of the image of said fixed straight line on said optical pickup means.

8. A facsimile system comprising means for moving message copy past a predetermined scanning line, means to illuminate the message copy passing said scanning line, optical means for focusing the copy passing said scanning line on a fixed straight line, an opaque member located in the optical path having a linear optical aperture thereby limiting the projected image substantially to said fixed straight line, a plate having an optical aperture curved to form an involute having a predetermined base circle, said plate being positioned adjacent said opaque member with a tangent of said base circle substantially coincident with the linear optical aperture in the opaque member, means to rotate said plate to produce a traveling intersection of said linear optical aperture and involute optical aperture, optical pickup means, and optical means for projecting successive elemental areas of the image of said fixed straight line on said optical pickup means, said linear optical aperture being not longer than the pitch of said involute.

References Cited in the file of this patent

UNITED STATES PATENTS

| | | |
|---|---|---|
| 1,546,193 | Bissiri | July 14, 1925 |
| 1,801,756 | Robb | Apr. 21, 1931 |
| 2,184,160 | Stockbarger | Dec. 19, 1939 |
| 2,227,011 | Schlesinger | Dec. 31, 1940 |

FOREIGN PATENTS

| | | |
|---|---|---|
| 361,470 | Great Britain | Nov. 26, 1931 |